United States Patent [19]
Yamada et al.

[11] Patent Number: 5,301,197
[45] Date of Patent: Apr. 5, 1994

[54] BIT ERROR RATIO DETECTOR

[75] Inventors: Akio Yamada; Katsuhiro Sasaki, both of Tokyo, Japan

[73] Assignee: Nec Corporation, Japan

[21] Appl. No.: 748,682

[22] Filed: Aug. 22, 1991

[30] Foreign Application Priority Data

Aug. 22, 1990 [JP] Japan .................................. 2-220515

[51] Int. Cl.$^5$ ............................................. G06F 11/00
[52] U.S. Cl. ..................................... 371/5.1; 371/21.1
[58] Field of Search ...................... 371/37.1, 5.1, 5.8, 371/16.5, 44, 20.1, 28, 29.1, 47.1, 38.1; 455/67.1; 375/10

[56] References Cited

U.S. PATENT DOCUMENTS 4,920,537  4/1990  Darling et al. .................. 371/5.1
5,148,431  9/1992  Hayashi ........................... 371/5.1

OTHER PUBLICATIONS

Vol. II, Elements of Digital Satellite Communication, Channel Coding and Integrated Services Digital Satellite Networks, Computer Science Press, 1985, William W. Wu.

Primary Examiner—Vincent P. Canney
Attorney, Agent, or Firm—Ostrolenk, Faber, Gerb & Soffen

[57] ABSTRACT

An error ratio detector according to the present invention, which detects the error ratio of error correction-coded data with a syndrome, reduces the error pulse occurrence probability by using only the errors in an M (<N) period within each block (of N bits) as errors for calculating the error ratio, and thereby makes it possible to assess the bit error ratio in a high BER region even where blocks are rather long.

5 Claims, 3 Drawing Sheets

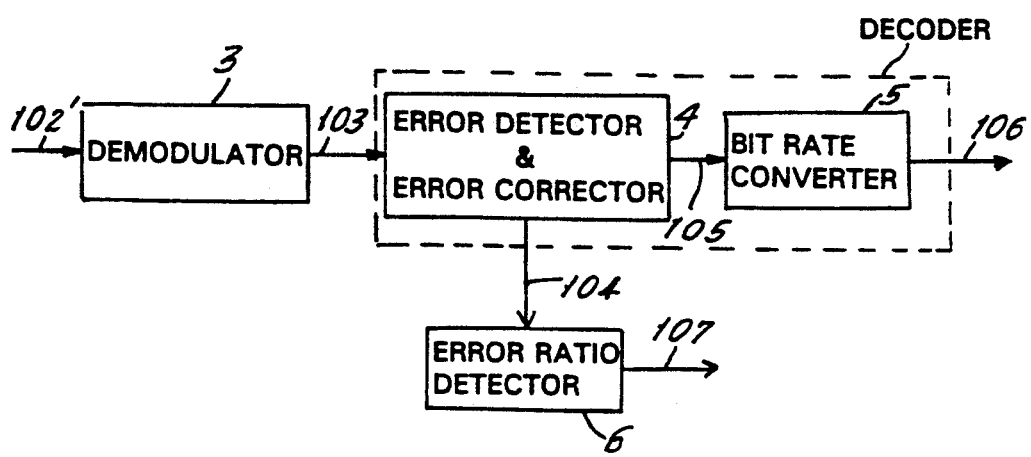
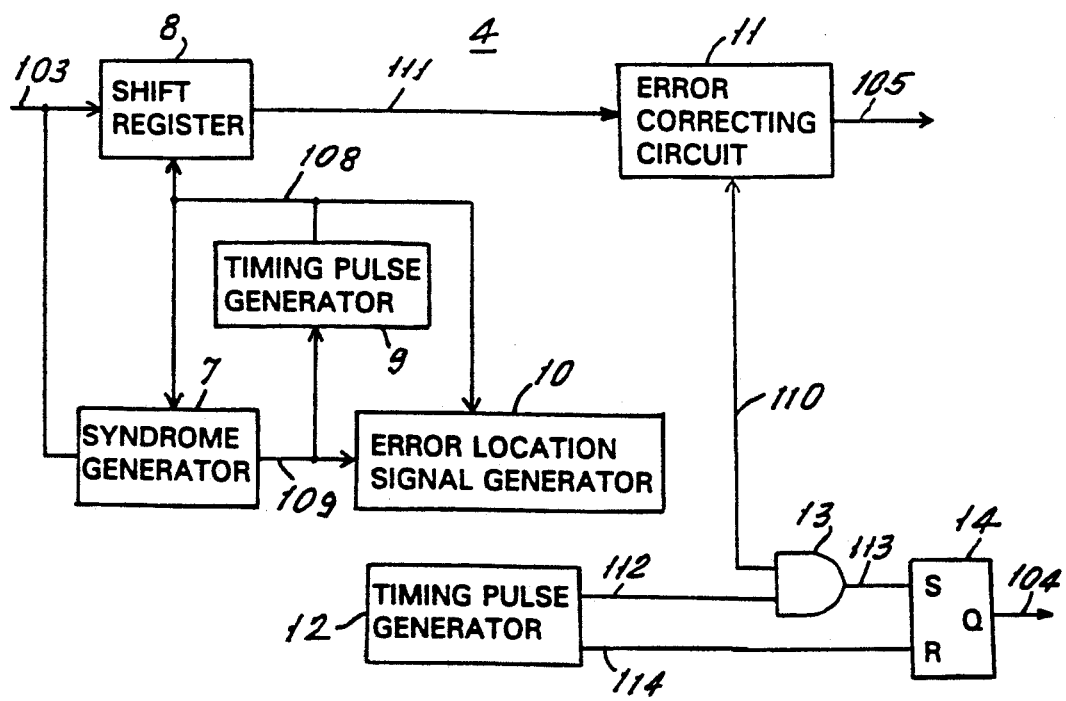

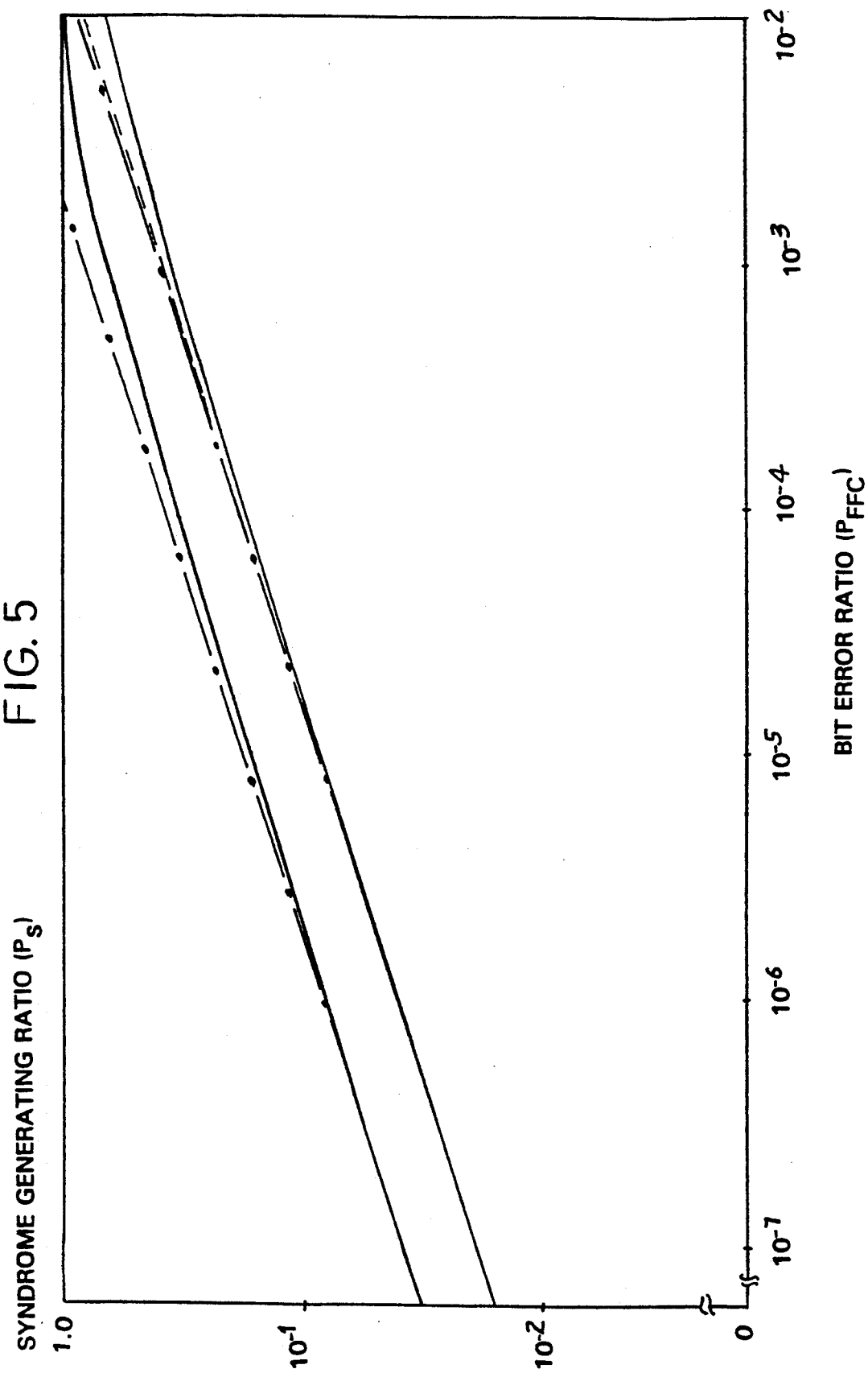

BIT ERROR RATIO DETECTOR

BACKGROUND OF THE INVENTION

The present invention relates to a bit error ratio detector, and more particularly to a bit error ratio detector for digital radio communication using error correction codes.

In a digital radio communication system, the quality of the working transmission line is monitored and, when the quality of the line degrades, either the line is switched to a standby line or an alarm indication signal (AIS) is issued. A technique used for this monitoring of line quality is embodied in bit error ratio detector which assess line quality by calculating the bit error ratio (BER). Some of these bit error ratio detectors use a syndrome. A bit error ratio detector using a syndrome subjects coded data from the transmitting side, error correction-coded block by block, to error correcting operation, and outputs the syndrome. The BER detector detects the presence or absence of any code error in each block responsive to the syndrome and calculates a code error ratio over a period of a plurality of blocks. By converting this code error ratio into a BER, the quality of the line is assessed.

Meanwhile, when t-multiple error correction code is used, if this block length is reduced, the redundancy will generally increase, resulting in a decline in the efficiency of frequency utilization in the digital radio communication system. It is therefore desirable for increasing the efficiency of line utilization to extend the block length so as to achieve a proper level of redundancy. However, a extended block length means a correspondingly higher probability of syndrome occurrence, further resulting in a correspondingly higher probability of the occurrence of error pulses generated by the syndrome. The probability of error pulse occurrence rises with an increase in BER, eventually reaching 100%. As a consequence, where the bit error ratio so much deteriorates as to surpass, for instance $10^{-3}$, the probability of error pulse occurrence will no longer significantly vary with a change in BER. This means that a BER higher than a certain level makes it impossible for the quality of the line to be accurately assessed.

SUMMARY OF THE INVENTION

An object of the present invention, therefore, is to provide a bit error ratio detector capable of accurately detecting the BER even if the block length is extended.

Another object of the invention is to provide a BER detector capable of improving the BER detecting capability even in a high BER region.

According to the invention, there is provided a BER detector equipped with timing pulse generating means for generating a timing pulse in a predetermined part of each block of error correction-coded data, error pulse generating means for generating an error pulse if an error is found in said predetermined part, and error ratio detecting means for detecting the error ratio according to the number of said error pulses.

In accordance with more specific feature of the invention, the BER detector is further provided with syndrome generating means for generating a syndrome by entering said data, and error location signal generating means for generating from said syndrome an error location signal indicating the bit location where each bit error has occurred. The said error pulse generating means consists of an AND gate which undergoes the inputting of said timing pulse and said error location signal and outputs an error detection signal, and means for generating from said error detection signal an error pulse indicating the presence or absence of any error in each block.

BRIEF DESCRIPTION OF THE DRAWINGS

FIG. 2 is a block diagram illustrating the configuration of the receiving side used in the error correction transmission system;

FIG. 3 is a block diagram illustrating the internal configuration of the error detector and error corrector 4 according to the invention shown in FIG. 2;

FIG. 5 is a graph for describing the relationship between the bit error ratio and the probability of syndrome generation.

DETAILED DESCRIPTION OF THE PREFERRED EMBODIMENT

The present invention will now be described in detail with reference to the accompanying drawings.

Figure 1:
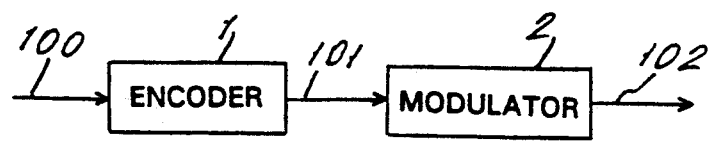
FIG. 1 is a block diagram illustrating the configuration of the transmitting side used in an error correction transmission system.

FIG. 1 is a block diagram illustrating the configuration of the transmitting side used in an error correction transmission system. An encoder 1 converts data 100 of f0 bits/sec in transmission rate to data of f1 bits/sec in transmission rate by way of a block code (n, k). In this conversion, the data 100, supplemented with (n−k) redundant bits for every k bits to undergo error correction coding, are turned into coded data 101. The coded data 101 take on a block composition in which each block consists of n bits, including k bits of data and (n−k) redundant bits. The transmission rate of the coded data 101 is f1=[n/k]f0. A modulator 2 modulates a carrier with the coded data 101 to output a modulated signal 102.

FIG. 2 is a block diagram illustrating the configuration of the receiving side used in the error correction transmission system. A demodulator 3 demodulates a modulated signal 102', sent from the transmitting side, and outputs regenerated coded data 103, which constitute a demodulated signal. A decoder comprises an error detector and error corrector 4 and a bit-rate converter 5. The error detector and error corrector 4 subjects the regenerated coded data 103 to error correcting operation to generate a syndrome, and outputs an error pulse 104 which is generated from this syndrome and indicates the presence or absence of any error in each block as will be described in further detail below. The error detector and error corrector 4 also outputs corrected data 105 of f1 bits/sec in transmission rate, having undergone error correction. The bit rate converter 5 removes redundant bits from the corrected data 105, and outputs data 106, whose transmission rate has been converted from f1 to f0 bits/sec. An error radio detector 6 counts the error pulses 104 for a period of i (i is 2 or a greater integer) blocks, calculates the code error ratio by dividing the error pulse count by i, and outputs a bit error ratio (BER) 107, converted from the code error ratio.

FIG. 3 is a block diagram illustrating the internal configuration of the error detector and error corrector 4 according to the invention shown in FIG. 2. The coded data 103, outputted from the demodulator 3, are supplied to a syndrome generator 7 and a shift register 8. The syndrome generator 7 generates a syndrome 109 by dividing the coded data 103 by a predetermined generation polynomial at the timings of a clock supplied from a first timing pulse generator 9 and a block timing pulse 108 indicating the starting point of each block. The first timing pulse generator 9 supplies the clock and the block timing pulse 108 to the syndrome generator 7, the shift register 8 and an error location signal generator 10. The block timing pulse may be generated from the clock. In FIG. 3, the clock and the block timing pulse are represented together by a single line 108. The first timing pulse generator 9 judges whether or not the coded data 103 are in synchronism with both the clock and the block timing pulse 108 according to the presence or absence of the syndrome 109 and, in an asynchronization state, shifts the phases of the clock and the block timing pulse 108. The error location signal generator 10 detects the error location in the coded data 103 according to the syndrome 109, and outputs an error location signal 110 indicating the error location. For details on error correction decoding by the syndrome generator and the error location signal generator, reference may be made to, for instance, Chapter 6: "Error code Implementation" of a book entitled Elements of Digital Satellite Communication, vol. 2 by William W. Wu published by Computer Science Press, reprinted 1985, and accordingly its description is dispensed with here.

A read only memory (ROM), for instance, can be used as the error location signal generator 10. The shift register 8 delays the coded data 103 by the time required for detecting the location of any error in the data 103, i.e. the processing time taken by the syndrome generator 7 and the error location signal generator 10, and outputs delayed coded data 111. An error correcting circuit 11 corrects errors in the delayed coded data with the error location signal 110, and outputs the corrected data 105, which are supplied to the bit-rate converter 5 of FIG. 2.

Figure 4:
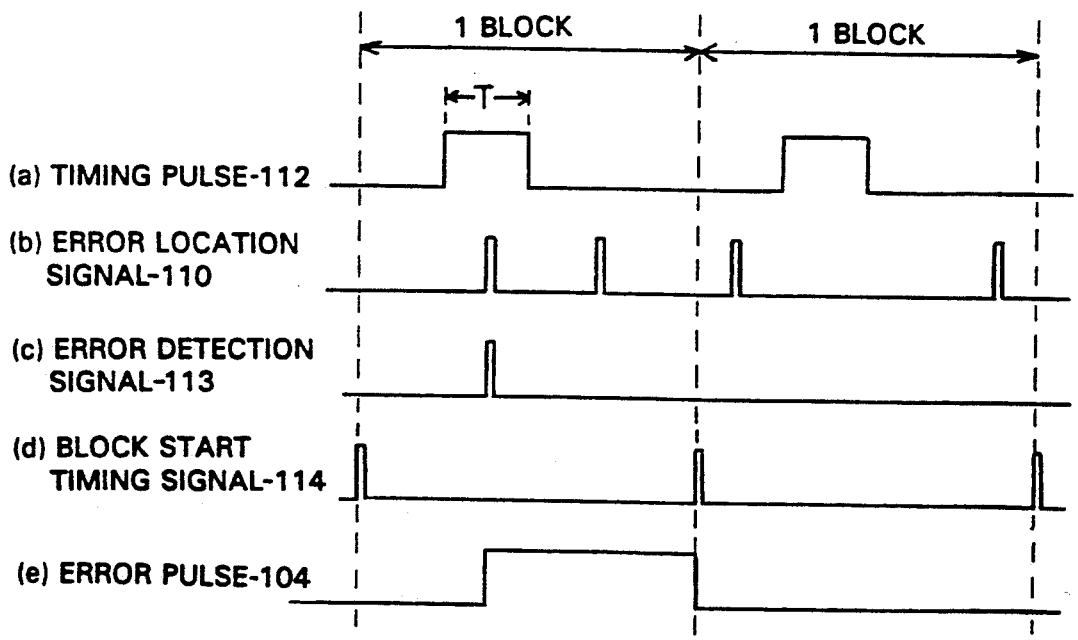
FIG. 4 is a time chart for describing the operation of some of the circuits shown in FIG. 3.

Now will be described the operations of a second timing pulse generator 12, an AND gate 13 and an SR flip-flop (F/F) 14 with reference to the time chart given as FIG. 4. The second timing pulse generator 12 outputs a timing pulse 112 (FIG. 4(a)) at one of two levels, for instance the high level, for a period T within one block. The period T is smaller than the block length n. An error detection signal 113 (FIG. 4(c)) will be outputted if the error location signal 110 (FIG. 4(b)) from the error location signal generator 10, indicating the location of any error, is within the period T of the timing pulse 112. If the error location signal 110 is not within the period T of the timing pulse 112, no error detection signal 113 will be outputted. The F/F 14 undergoes the inputting of the error detection signal 113 at its set terminal S and a block start timing signal 114 (FIG. 4(d)), supplied from the second timing pulse generator 12, at its reset terminal R, and outputs an error pulse 104 (FIG. 4(e)) from its output terminal Q. The block start timing signal 114 is a pulse indicating the starting point of each block, and is the same as the block timing pulse 108. Therefore the block timing pulse outputted from the first timing pulse generator 9 may as well be supplied to the reset terminal R of the F/F 14. The error pulse 104 is a pulse which falls to its low level at the beginning of each block and rises when the error detection signal 113 is supplied, and thereby indicates the presence or absence of any code error in the block. This error pulse 104 is supplied to the error ratio detector 6 shown in FIG. 2.

Thus, unlike the prior art by which the bit error ratio was calculated by directly taking the presence or absence of a syndrome from the syndrome generator 7 as the presence or absence of an code error, the present invention, by which an error pulse is generated from an error location signal occurring in a certain period within each block, serves to reduce the probability of error pulse occurrence and makes it possible to calculate the BER accurately even where it is rather high.

A specific example will be described below to facilitate understanding of the invention.

It is supposed that a block code has k data bits and (n−k) redundant bits. This block code length is n bits, and the syndrome occurrence probability $P_S$ is:

$$P_S = 1 - (1-P)^n \tag{1}$$

where P is the BER before error correction.

The syndrome occurrence probabilities $P_{S1}$ and $P_{S2}$ where the block length n is 63 and 511, respectively, are:

$$P_{S1} = 1 - (1-P)^{63}$$

$$P_{S2} = 1 - (1-P)^{511}$$

Since the BER P is greater than 0 and smaller than 1, (1−P) is also greater than 0 and smaller than 1, and $(1-P)^{63}$ is greater than $(1-P)^{511}$. Accordingly:

$$P_{S1} < P_{S2} \tag{2}$$

Inequality (2) indicates that the greater the block length n, the higher the probability of syndrome occurrence. Since the probability of error pulse occurrence is usually equal to that of syndrome occurrence, the former rises with an increase in block length n.

Considering a case of multiple error correction, the BER $P_{FEC}$ after the error correction where three or more errors have arisen is:

$$P_{FEC} = \sum_{i=3}^{n} \frac{i+2}{n} \cdot nC_i \cdot P^i \cdot (1-P)^{n-1} \tag{3}$$

where i is the number of erroneous bits and P, the BER before the error correction.

FIG. 5 shows the relationship between the syndrome occurrence probability of equation (1) and the post-correction BER of equation (3) with respect to two different block lengths, n=63 and n=511. In FIG. 5, solid lines 115 and 116 show the symulation value where n is 511 and 63, respectively. The one-point chained lines represent the linear extrapolations of high BER regions with the values at BER's of $10^{-7}$ and $10^{-6}$, respectively. The figure shows that, when n is 63, the BER can be accurately assessed from the syndrome occurrence probability even in a high BER region (for instance from $10^{-3}$ to $10^{-2}$ in BER) because the syndrome occurrence probability varies with a significant change in the BER, but, when n is 511, it is difficult to accurately estimate the BER from the syndrome occurrence probability because the latter does not significantly vary with a change in the former.

Thus, because the error pulse occurrence probability (syndrome occurrence probability) does not markedly vary in a high BER region if the block is longer than a certain extent, and accordingly it is impossible to calculate the BER from the syndrome occurrence probability. Therefore, by the prior art, it was impossible to calculate the BER in a high BER region as the BER was calculated by directly taking the presence or absence of a syndrome as the presence or absence of a code error. In view of this shortcoming, the present invention reduces the error pulse occurrence probability by taking as effective only those errors occurring in a predetermined period within each block. Therefore, even where the block length n is 511, the syndrome occurrence probability as well varies with a change in BER even in a high BER region as where the block length n is 63, making it possible to accurately estimate the BER from the syndrome occurrence probability in such a region, too.

The pulse width T of the timing pulse 112 is determined by the block length n and the region of the BER to be detected. Within each block, the timing pulse may be generated in any desired location. There may be not just one pulse but more than one within a block. Where the block length n is 511 consisting of 493 data bits and 18 redundant bits, in order to detect the BER of up to about $10^{-2}$, it is preferrable to set the width T of the timing pulse 112 equal to about ½ of the block length. In this case, a broken line 117 shown in FIG. 5 is obtained by simulation. The line 117 is near the one-point chained line of n=63. Therefore, the syndrome occurrence probability varies with a change in BER. If the BER is to be accurately calculated in an even higher BER region, the ratio of the timing pulse width to the block length can be further reduced.

As hitherto described, the present invention makes it possible to accurately calculate the BER in a high BER region by generating an error pulse from an error location signal in a part of each block and thereby reducing the error pulse occurrence probability.

What is claimed is:

1. An error detector for calculating the error ratio from error correction-coded data, comprising:

syndrome generating means for generating a syndrome by receiving said data;

error location signal generating means for generating from said syndrome an error location signal indicating the bit location where each bit error has occurred;

timing pulse generating means for generating a timing pulse in a predetermined period within each block of data;

error pulse generating means for generating an error pulse if said error location signal is generated in said predetermined period; and error ratio detecting means for calculating the bit error ratio (BER) according to the number of said error pulses in predetermined blocks.

2. An error ratio detector, as claimed in claim 1, wherein:

said error pulse generating means consists of an AND gate which undergoes the inputting of said error location signal and said timing pulse, and outputs an error detection signal; and a flip-flop which undergoes the inputting of said error detection signal at its set terminal and a timing pulse indicating the starting point of a block at its reset terminal, and outputs said error pulse.

3. An error ratio detector, as claimed in claim 1, wherein:

said error location signal generating means is a read only memory.

4. An error ratio detector, as claimed in claim 1, further comprising:

delaying means provided in parallel with said syndrome generating means for delaying said data by a predetermined length of time and for outputting delayed data;

clock generating means for generating a clock and a timing signal indicating the timing of the starting point of each block to be supplied to said syndrome generating means, said error location signal generating means and said shift register, and for adjusting the phases of said clock and timing signal responsive to said syndrome; and error correcting means for correcting any error in said delayed data with said error location signal, and outputs corrected data.

5. An error ratio detector, as claimed in claim 4, wherein:

said predetermined length of time is the time taken by the processing at said syndrome generating means and said error location signal generating means.

* * * * *